United States Patent [19]
Brooks, Jr.

[11] 3,843,013
[45] Oct. 22, 1974

[54] METER BOX

[75] Inventor: Frank M. Brooks, Jr., San Marino, Calif.

[73] Assignee: Brooks Products Inc., El Monte, Calif.

[22] Filed: Apr. 2, 1973

[21] Appl. No.: 347,128

[52] U.S. Cl. .............................. 220/55 K, 220/60 R
[51] Int. Cl. .................................. B65d 45/00
[58] Field of Search ........ 220/55 R, 60, 24 R, 24 A, 220/31, 32, 33, 34, 38, 41

[56] References Cited
UNITED STATES PATENTS

| | | | |
|---|---|---|---|
| 1,015,907 | 1/1912 | Ryder | 220/55 L |
| 1,300,899 | 4/1919 | Wagner | 220/55.7 |
| 2,839,214 | 6/1958 | Crane | 220/60 R |
| 2,866,574 | 12/1959 | Roumeliotis | 220/55 K |
| 2,884,155 | 4/1959 | Hanson | 220/60 R |
| 3,326,408 | 6/1967 | Ringlen | 220/60 R |
| 3,424,341 | 1/1969 | Slapnic | 220/60 R |
| 3,477,609 | 11/1969 | Winkler, Jr. | 220/60 R |
| 3,490,637 | 1/1970 | Pope | 220/55 W |
| 3,537,575 | 11/1970 | Haidegger | 220/60 R |
| 3,556,339 | 1/1971 | Lind | 220/60 R |
| 3,666,338 | 5/1972 | Russell | 220/55 K |

Primary Examiner—William I. Price
Assistant Examiner—Ro. E. Hart
Attorney, Agent, or Firm—Lyon & Lyon

[57] ABSTRACT

A meter box molded out of fibrous plastic material open at its upper side and having a peripheral cover supporting ledge surrounded by an offset marginal rim having keeper means; the box including a cover structure also formed of fibrous material and fitted within the offset rim; resting on the supporting ledge, and having cooperating latching means. One embodiment of the cover involves a yieldably mounted latching boss; another embodiment involves a slidable bolt, both being operable by insertion of a tool to effect separation of the cover from the box.

3 Claims, 8 Drawing Figures

PATENTED OCT 22 1974　　　　　　　　　　　　　　　3,843,013

METER BOX

BACKGROUND AND SUMMARY OF THE INVENTION

Meter boxes are customarily formed of concrete, and are fitted with a concrete cover, the weight of which retains the cover in place. There is an increasing need to provide a meter box which can be set in the ground, in the manner of a concrete meter box, but which is less in weight; for example a meter box formed of plastic material is feasible. However, because of the light weight, the cover should be secured.

The present invention is directed to a meter box formed of high strength plastic containing fibrous material, which incorporates a latching means to secure the cover, and is summarized in the following objects.

First, to provide a meter box having a peripheral cover supporting ledge bordered by an offset rim having keeper recesses in opposite ends to receive a cover having mating latch elements at opposite ends, one of the latch elements being retractable.

Second, to provide a meter box as indicated in the preceeding object wherein the cover is provided with a depending rim confronting the offset rim carrying the fixed and retractable latch elements, and also having an opening for insertion of a tool or permitting manual engagement of the cover so as to apply an upward force for removing the cover.

Third, to provide a meter box as indicated in the preceeding objects wherein an embodiment includes a yieldable portion of the cover rim carrying the retractable latching element for disengagement by deflection of the yieldable portion.

Fourth, to provide a meter box as indicated in the preceeding objects wherein an embodiment includes a sliding bolt mounted in the cover and forming the retractable latching element.

Figure 1:
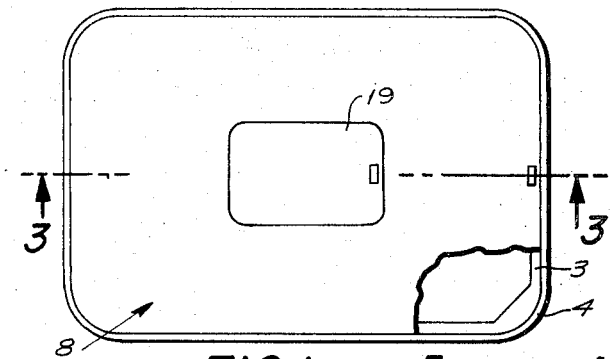
FIG. 1 is a plan view of the meter box with a portion of the cover broken away.
Figure 2:
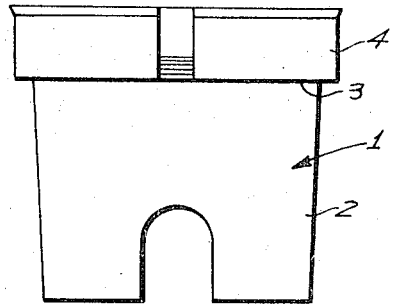
FIG. 2 is an end view of the meter box.
Figure 3:
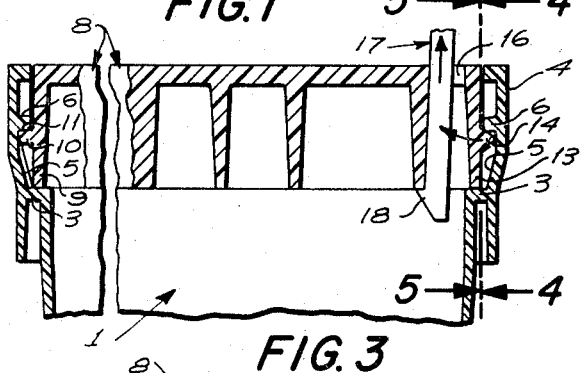
FIG. 3 is an enlarged fragmentary longitudinal sectional view thereof taken through 3—3 of FIG. 1.
Figure 4:
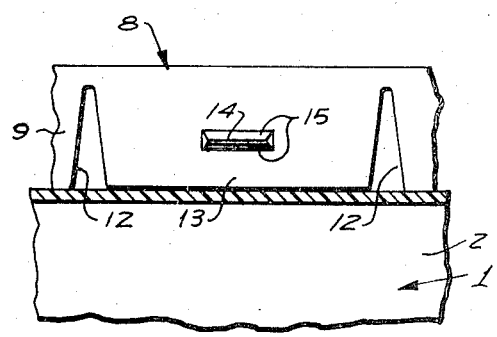
FIG. 4 is a fragmentary sectional view taken through 4—4 of FIG. 3 with portions in elevation.

The meter box includes a box member 1 which is essentially rectangular in plan and includes side walls 2. Formed in the lower portions of the side walls are recesses to clear pipe extending from a meter positioned within the box.

The upper end of the box member is provided with a peripheral ledge 3 joined to an offset upwardly extending rim 4. The rim includes two end portions each of which is provided with a keeper recess 5 having a cross rib 6 and a vertical rib 7. The cross rib forms the upper boundary of the keeper recess while the vertical rib forms a guide.

The box member receives a cover 8 having a peripheral rim 9 which fits within the offset rim 4 in confronting relation therewith. The peripheral rim includes two end portions, one of which is provided with a fixed latch boss 10 confronting one of the keeper recesses 5. The latch boss 10 is provided with a flat upper ledge 11 which bears directly against the underside of the cross rib 6 so that the cover must be pivoted to move the latch boss 10 clear of the cross rib 6.

The opposite end of the peripheral rim 9 is provided with a pair of spaced slots 12 forming therebetween a yieldable web 13 confronting the remaining keeper recess 5. The yieldable web is provided with a latch boss 14 engageable with the corresponding cross rib 6. The surfaces of the latch boss 14 are tapered as indicated by 15 so that the corresponding end of the cover may be forced downward causing the web 13 to deflect.

The cover member is provided with an aperture 16 which receives a tool 17 having a hook 18 so that the cover may be forcibly pulled upward and cause the latch boss 14 to deflect the yieldable web 13.

The central portion of the cover 8 may be provided with a removable cover plate 19.

Operation of the meter box as shown in FIGS. 1 through 5 is as follows:

The cover 8 is positioned by inserting the fixed latch boss 10 into the corresponding recess with the cover disposed of an incline. The opposite end of the cover is then forced downward deflecting the latch boss 14 and its yieldable web 13 until the latch boss 14 is received in its corresponding keeper recess 5.

To remove the cover, the tool 17 is inserted through the aperture 16 and its hook 18 engages the underside of the cover. An upward pull on the tool is sufficient force to deflect the web 13 to accomplish removal of the cover. If the cover is provided with an inspection plate 19 the inspection plate may be removed or pivoted if the inspection plate is so mounted so that one can manually grab the margin of the opening which receives the inspection plate and pull upward to disengage the latch boss 14.

Figure 7:
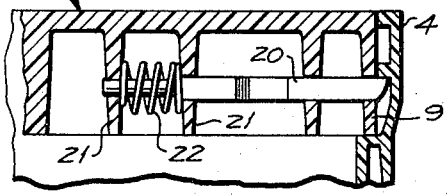
FIG. 7 is a fragmentary sectional view taken through 7—7 of FIG. 6.
Figure 5:
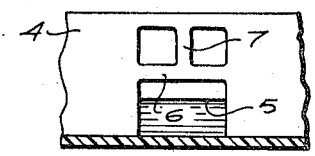
FIG. 5 is a fragmentary sectional view taken in the same plane as FIG. 4 but directed in the opposite direction.
Figure 6:
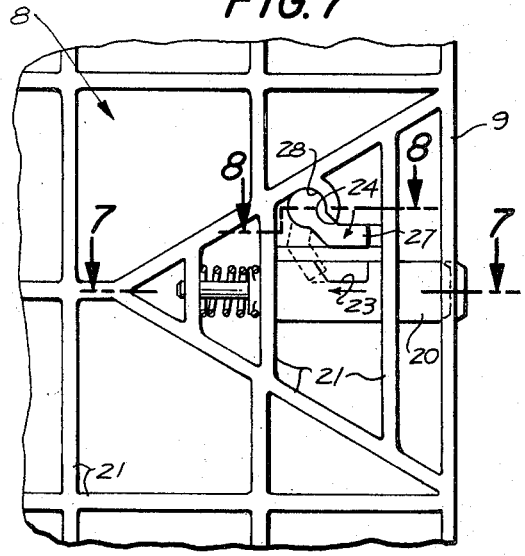
FIG. 6 is a fragmentary bottom view showing a modified form of the cover.
Figure 8:
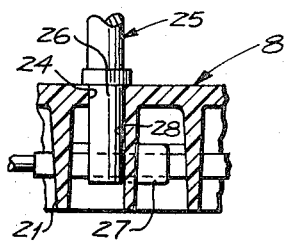
FIG. 8 is a fragmentary sectional view taken through 8—8 of FIG. 6.

Reference is now directed to FIGS. 5, 6 and 7. The construction here illustrated employs a sliding bolt 20 which is guided through appropriate slots provided in reinforcing webs 21 depending from the upper surface of the cover. The reinforcing webs 21 are preferably provided in the cover even though the cover is fastened as shown in FIGS. 1 through 5 by use of the latch bosses 10 and 14. In other words, the bolt 20 may be substituted for the latch boss 14 by providing appropriate guide openings in the web 13 and in the reinforcing webs 21.

The bolt 20 protrudes in the manner of the latch boss 14 and is urged outward by a spring 22. One lateral margin of the bolt 20 is provided with a cam slot 23. Formed in the cover is a tool opening 24.

A tool or key member 25 is utilized which comprises a shaft 26 and a laterally extending arm forming a key extension 27. The position of the tool opening 24 is such that when the tool is inserted the key extension 27 extends alongside the bolt opposite the cam slot 23 so that by operating the key extension, the key extension engages the bolt to retract the bolt as indicated by dotted lines in FIG. 6. In order to facilitate rotation of the tool 25, the shaft adjacent to the key extension is received in a journal channel 28.

While particular embodiments of this invention have been shown and described, it not intended to limit the same to the details of the constructions set forth, but instead, the invention embraces such changes, modifications and equivalents of the various parts and their relationships as come within the purview of the appended claims.

I claim:

1. A meter box, comprising:
    a. a meter box member having an open upper end bordered by an outwardly extending horizontal ledge terminating in an upwardly extending rim, the rim having opposed portions, and a keeper rib on the inner surface of each of said opposed portions;
    b. a cover member of resilient material including a downwardly extending peripheral flange resting on the ledge and confronting the upwardly extending rim, the flange at one end of the cover including a flexible portion confronting one of said keeper ribs and capable of deflection away from the rib;
    c. a first latch boss at the end opposite from the flexible portion engageable with the corresponding keeper rib and disengageable therefrom upon pivotal movement of the cover about an axis coinciding with first latch boss;
    d. a second latch boss carried by the flexible portion of the cover flange, the second latch boss having sloping cam surfaces engageable with the corresponding keeper rib to deflect the flexible portion for camming over the corresponding keeper rib upon forcibly pivoting the cover member in either direction about said axis; and
    e. tool engageable means with said cover adjacent said second latch boss for forcible pivoting of said cover to open position.

2. A meter box as defined in claim 1 wherein said tool engageable means comprises a substantially rigid rib on the inner face of said cover adjacent said second latch boss, and an opening through said cover member adjacent said rigid rib.

3. A meter box as defined in claim 1 wherein said peripheral flange is provided with a slit on each side of said second latch boss.

* * * * *